UNITED STATES PATENT OFFICE.

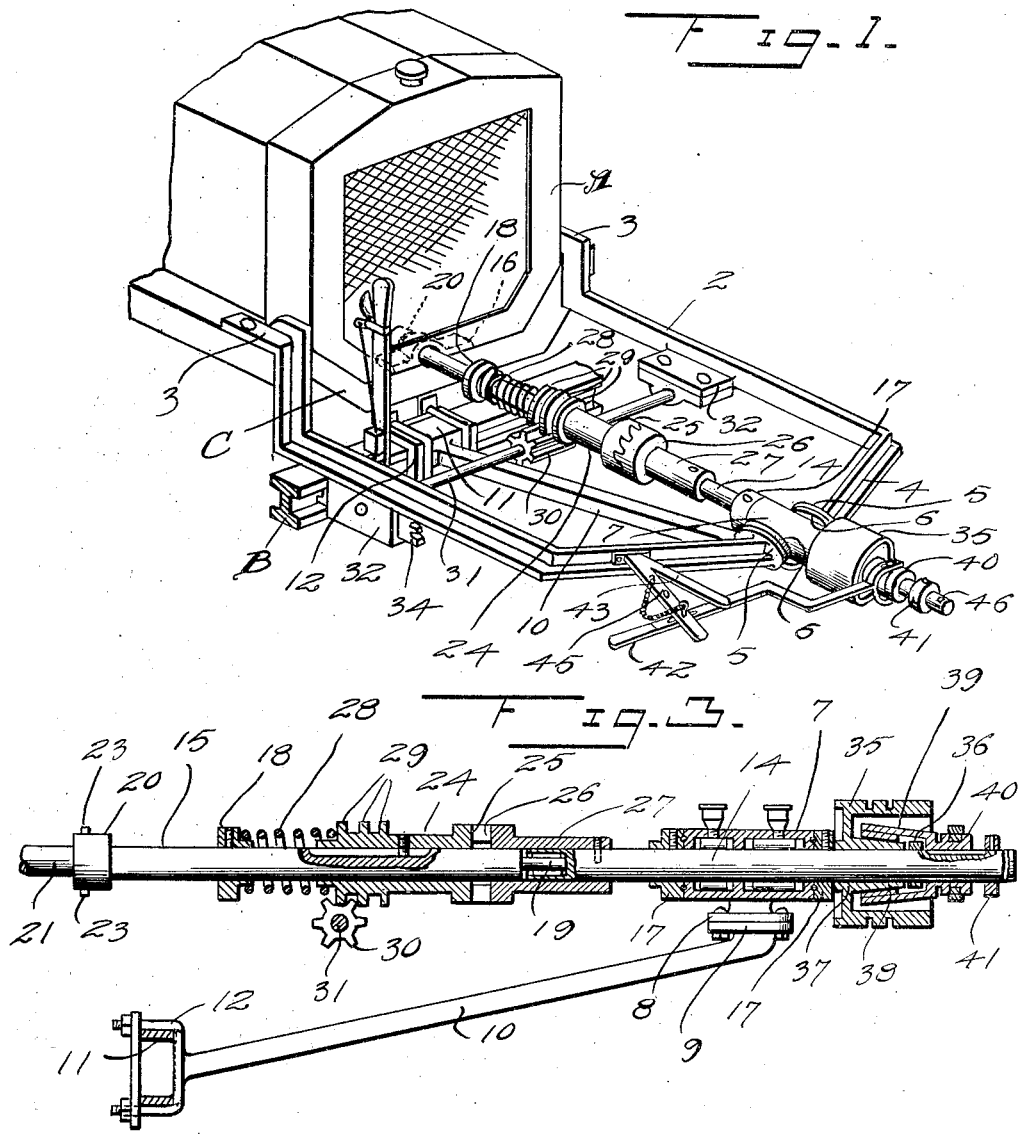

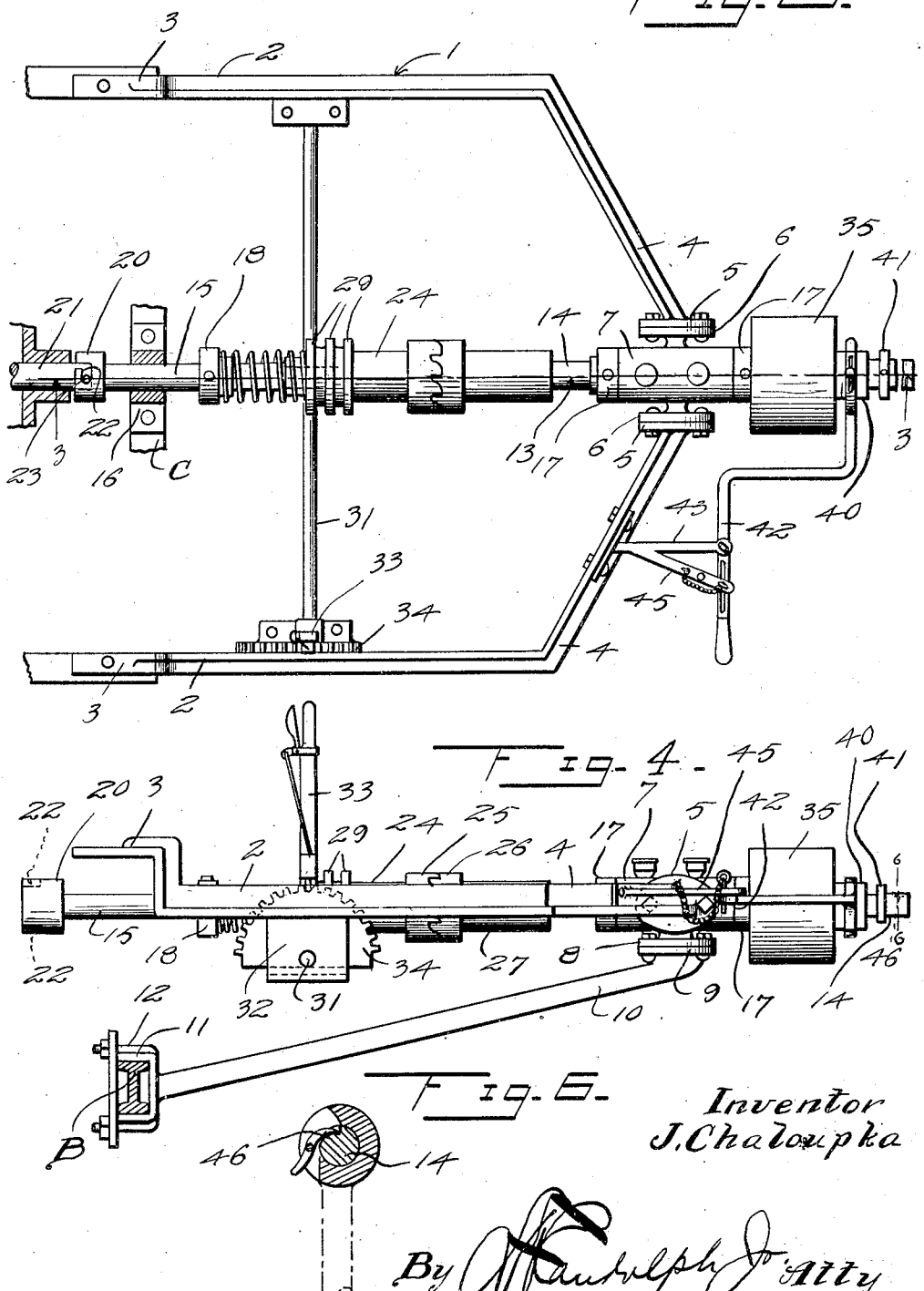

JOSEPH CHALOUPKA, OF OMAHA, NEBRASKA.

ATTACHMENT FOR AUTOMOBILES.

1,355,537. Specification of Letters Patent. Patented Oct. 12, 1920.

Application filed June 10, 1919. Serial No. 303,203.

*To all whom it may concern:*

Be it known that I, JOSEPH CHALOUPKA, a citizen of the United States, residing at Omaha, in the county of Douglas and State of Nebraska, have invented certain new and useful Improvements in Attachments for Automobiles; and I do hereby declare the following to be a full, clear, and exact description of the invention, such as will enable others skilled in the art to which it appertains to make and use the same.

This invention relates to attachments for automobiles, and more particularly to an attachment by means of which the automobile may be readily adapted for operating sawmills, hay stackers, and similar machines.

One of the main objects of the invention is to provide an attachment of the character stated of comparatively simple construction and operation which may be readily applied to an automobile of standard construction. A further object is to provide means for operatively connecting a drive pulley to the engine shaft of the automobile having associated therewith a control clutch for optionally throwing the pulley into and out of operation. A further object is to provide a sectional transmission shaft for rotating the pulley, clutch means being provided whereby, when the pulley is not utilized, as when the automobile is in transit, the inner section of this shaft may be disconnected from the outer section so as to avoid waste of power in rotating the outer section of the shaft and the parts associated therewith when the pulley is not in use. Further objects will appear from the detailed description.

In the drawings:

Figure 1 is a perspective front view of the attachment as applied to an automobile of known type.

Fig. 2 is a plan view of the attachment and parts associated therewith.

Fig. 3 is a section taken substantially on line 3—3 of Fig. 2.

Fig. 4 is a side view of the attachment.

Fig. 5 is a detail of the bearing sleeve for the transmitting shaft.

Fig. 6 is a detail cross secton taken on the line 6—6 of Fig. 3.

A substantially U-shaped frame designated generally by 1 is provided at the rearward end portion of each side arm 2 with a rectangular or L-shaped member 3 which is adapted to fit about the end portion of the side sill of the chassis of the automobile designated generally by A, member 3 being securely bolted or otherwise fastened to the sills of the automobile chassis so as to secure the frame 1 in position projecting forwardly of the automobile in a horizontal plane, as in Fig. 1. Each of the side arms 2 is provided at its forward end with an integral inwardly directed front arm 4, these arms being inclined at a slight outward angle as illustrated. Each of the arms 4 is provided at its inner end with a plate 5 which is secured to a corresponding plate 6 carried by a cylindrical bearing sleeve 7 disposed axially of the frame. This sleeve is further provided with a plate 8 similar to the plate 6 and positioned beneath the sleeve, this plate 8 being detachably secured to the upper flattened end portion 9 of a central brace 10 which is inclined downwardly and rearwardly, this brace extending longitudinally of frame 1 at the center thereof and being provided at its rearward end with a channel member or foot 11 which is adapted to fit about the front and upper and lower faces of axle B of the automobile. Foot 11 is detachably secured to the axle centrally thereof by U-clips 12 passed about the frame and the axle, or in any other suitable equivalent manner. The frame constructed in this manner may be thus rigidly supported in horizontal position so as to project forwardly of the automobile, the brace 10 being detached from the axle and the frame when the automobile is in transit so as not to interfere with proper vertical movement of the automobile body on the chassis incident to shocks and jars encountered during travel.

The transmission shaft designated generally by 13 is rotatably mounted through bearing sleeve 7. This shaft is of sectional construction comprising a forward section 14 rotatably mounted in sleeve 7 and a rearward section 15 rotatably mounted in the usual bearing bracket 16 secured upon the lower bar of the radiator supporting frame C of the automobile A in the well known manner. Stop collars 17 are secured upon forward section 14 adjacent the ends of sleeve 7 so as to prevent longitudinal movement of this section in either direction, these collars being preferably, though not necessarily, provided with thrust ball bearings as illustrated. A stop collar 18 is secured upon section 15 adjacent the forward end of bracket 16 and acts to effectually prevent movement of the rearward section away from the forward section. Section 15 is provided at its forward end with an axially extending stud member 19 which fits into a corresponding bore provided in the inner end portion of section 14, this stud and the bore coöperating to maintain the two sections of the shaft in axial alinement while permitting rotary movement of inner section 15 independently of outer section 14.

Inner section 15 is provided on its inner end with a cylindrical coupling member 20 which is adapted to receive the outer end portion of crank shaft 21 of the engine of the automobile, this coupling member having inclined slots 22 adapted to receive the end portions of the usual pin 23 extending diametrically through shaft 21. A sleeve 24 is feathered on shaft section 15 and is provided on its outer end with a clutch member 25 adapted to coöperate with a similar clutch member 26 carried by a sleeve 27 secured on shaft section 14 for operatively connecting the sections of the shaft. An expansion coil spring 28 is mounted about shaft section 15 and confined between the sleeve 24 and collar 18, this spring acting to normally force clutch element 25 into operating engagement with clutch element 26. Sleeve 24 is provided with a plurality of spaced annular shoulders 29 which are adapted to be engaged by the teeth of a pinion 30 secured upon a clutch shifting rod 31 extending transversely of the frame 1 adjacent the transmission shaft 18 and rockably supported by hangers 32 depending from the side bars 2 of the frame. A shifting lever 33 is secured to shaft 31 at one end thereof, this lever being provided with a spring pressed detent coöperating with a segment 34 secured to frame 1 in the well known manner for securing the lever in rocked adjustment. By rocking lever 33 in proper direction, the shaft section 15 may be operatively connected to outer section 14 so as to cause rotation thereof, coupling member 20 being connected to the engine shaft in the manner described. By moving clutch element 25 into inoperative position out of engagement with element 26, the inner shaft 15 is permitted to rotate independently of the outer shaft section 14 thus avoiding wastage of power by unnecessary rotation of the outer shaft section and the parts associated therewith when the automobile is in transit.

A pulley 35 is loosely mounted on the outer shaft section 14 adjacent the outer end of bearing sleeve 7, suitable stop collars 36 being secured upon the shaft adjacent the outer end of the hub 37 of the pulley and coöperating with outer collar 17 to hold the pulley against movement longitudinally of the shaft while permitting rotation of the shaft independently of the pulley. Hub 37 of the pulley is extended and is tapered to provide a forwardly extending inner cone clutch member 38 which is adapted to fit snugly into an outer cone clutch member 39 provided with an outwardly extending neck 40 feathered upon shaft section 14 between collar 36 and an outer collar 41 secured to the shaft. A shifting lever 42 is rockably supported by a bracket 43 secured to frame 1 and is operatively connected by a fork designated generally by 44 of known type to neck 40 of clutch member 39. This lever is provided with a spring pressed detent coöperating with a rack 45 carried by bracket 43 for securing the lever in rocked adjustment. By means of shifting lever 42 and the parts associated therewith, cone clutch member 39 may be readily shifted into and out of operative engagement with clutch member 38 so as to optionally rotate pulley 35 when the outer shaft section 14 is rotated, this clutch and the shifting lever therefor giving direct control over the pulley.

Shaft section 14 is provided on its outer end, beyond collar 41, with a connecting device designated generally by 46 which is adapted to receive the usual socket member of a crank of any suitable or preferred type by means of which shaft section 14 may be rotated in one direction, this shaft being driven independently of the crank when the engine is in operation, in the known manner, so as to avoid injury to the operator. By shifting sleeve 24 so as to move clutch element 25 into engagement with clutch element 26, the transmission shaft 13 as a whole may be rotated by the crank so as to rotate the engine crank shaft 21 for starting the engine in the well known manner. After the engine has been started, clutch member 25 may be moved inwardly or rearwardly into inoperative position thus permitting independent rotation of shaft section 15, or the two clutch members may remain in operative engagement so as to cause rotation of the whole transmission shaft 13, the pulley 35 being optionally connected to this transmission shaft by means of the cone clutch and parts associated therewith, so as to be rotated. The pulley is adapted to receive a belt of suitable type for operatively connecting the same to a machine to be driven by the automobile engine in the known manner.

Preferably, in practice, though not necessarily, the rotating parts of the transmission means and the control clutches therefore will be provided with anti-friction bearings, such as roller bearings or ball bearings. Also, any suitable or preferred means may be employed for connecting the crank to the outer end of shaft section 14 for manually rotating the same to start the engine, though I prefer to employ the means illustrated. In practice, it may be found desirable to resort to slight changes in details of construction and arrangement of various parts of the mechanism, and I intend to include all such variations, as fall within the scope of the appended claims, in this application in which a preferred form only of my invention is disclosed.

What I claim is:

1. An attachment for automobiles comprising a frame secured to and projecting beyond the forward end of an automobile, a transmission shaft journaled in said frame and including forward and rearward sections, and said forward section having a bore in its rear end, a reduced extension formed on the front end of the rear section and received by said bore to keep the sections in axial alinement, means for connecting the rear section to the crank shaft of the engine of the automobile, a clutch element secured to the rear portion of the forward section, a clutch element splined to the rear section, a collar secured to the rear section and spaced from the second named clutch element, an expansion spring mounted on the rear section between the collar and the second named clutch element for normally urging the same into engagement with the first named clutch element, a transverse shaft journaled to the frame and underlying the transmission shaft, annular flanges formed on the second named clutch element, a gear secured to the transverse shaft and in mesh with said annular flanges, and means for rocking and locking said transverse shaft so as to engage and disengage the clutch elements, and a combined clutch and pulley secured to the forward end of the transmission shaft.

2. An attachment for automobiles comprising a frame including spaced side members having their rear ends disposed vertically and rearwardly for attachment to the side sills of a frame of an automobile, said side members having their forward portions bent in converging planes and terminating in spaced relation, a bearing sleeve disposed between the ends of the converging portions of the side members, flattened portions formed on said bearing sleeve and a pair of said portions secured to the ends of the converging portions of the side members, a brace detachably secured to the other flattened portion and detachably connected to an axle of the automobile, a transmission shaft journaled in said sleeve and connected to the crank shaft of the engine of the automobile, and a combined clutch and pulley carried by the forward end of the transmission shaft.

In testimony whereof I affix my signature in presence of two witnesses.

JOSEPH CHALOUPKA.

Witnesses:
  JOSEPH R. FIALES,
  FRED VLACK.